United States Patent [19]

Abboud

[11] Patent Number: 5,647,365

[45] Date of Patent: Jul. 15, 1997

[54] APODIZATION PARAMETER GENERATOR FOR ULTRASOUND MEDICAL IMAGING SYSTEM

[75] Inventor: William J. Abboud, Issaquah, Wash.

[73] Assignee: Siemens Medical Systems, Inc., Iselin, N.J.

[21] Appl. No.: 556,729

[22] Filed: Nov. 13, 1995

[51] Int. Cl.⁶ .................................................. A61B 8/00
[52] U.S. Cl. ........................... 128/661.01; 73/626
[58] Field of Search .................. 128/660.01, 660.06, 128/660.07, 661.01, 661.09; 73/625–626, 618

[56] References Cited

U.S. PATENT DOCUMENTS

| | | | |
|---|---|---|---|
| 4,550,607 | 11/1985 | Maslak et al. | 73/626 |
| 4,841,492 | 6/1989 | Russell | 128/660.06 X |
| 4,917,097 | 4/1990 | Proudian et al. | 128/661.01 X |
| 5,113,706 | 5/1992 | Pittaro | 128/661.01 X |
| 5,549,111 | 8/1996 | Wright et al. | 18/742 |

*Primary Examiner*—Francis Jaworski

[57] ABSTRACT

Apodization parameters for respective transducer elements are generated, for example, at a beam-former, by accessing a select look-up table. An apodization parameter generator circuit includes respective look-up tables for each of multiple window algorithms. The same look-up table is used for a given window algorithm regardless of (i) aperture size; (ii) whether performing transmit or receive beam-forming; and (iii) whether deriving elevation or azimuthal apodization parameters. Each of the multiple tables has a common, fixed number of entries. Such number is at least as big as the number of transducer elements along the longest axis of the host transducer array. For symmetrical tables, the number of entries is halved. A pointer into a look-up table is calculated from the elevational or azimuthal aperture size in elements ("N") and the location of the transducer element of interest ("n") along the aperture.

19 Claims, 5 Drawing Sheets

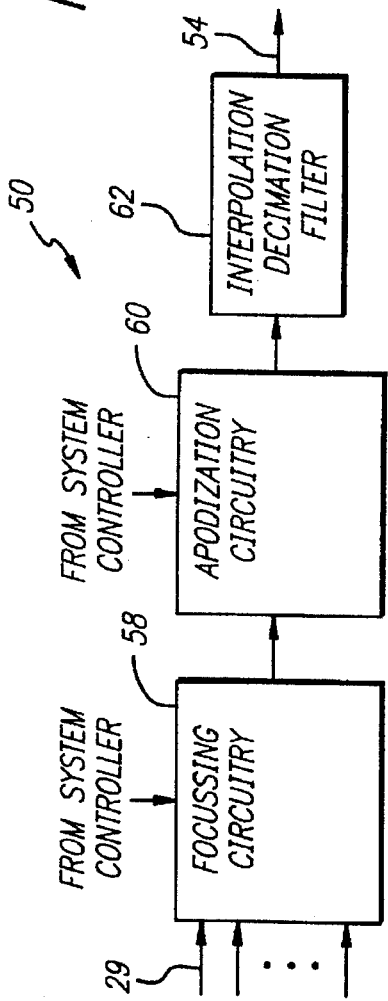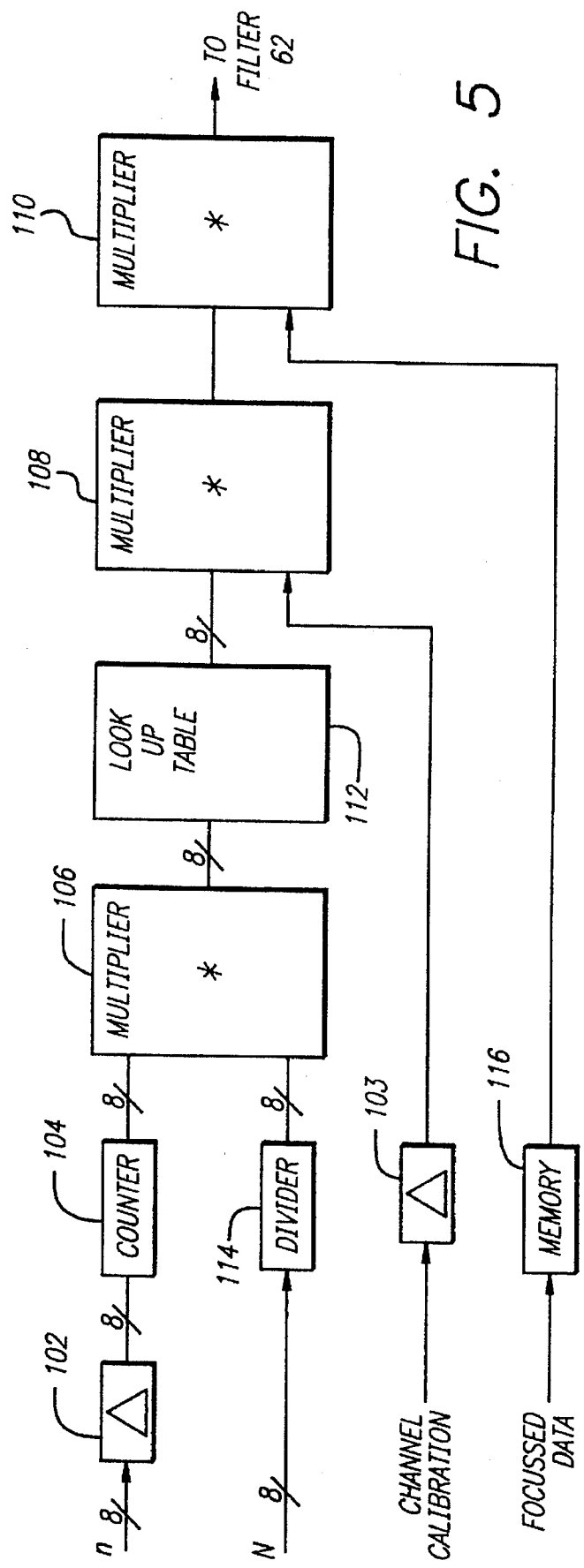

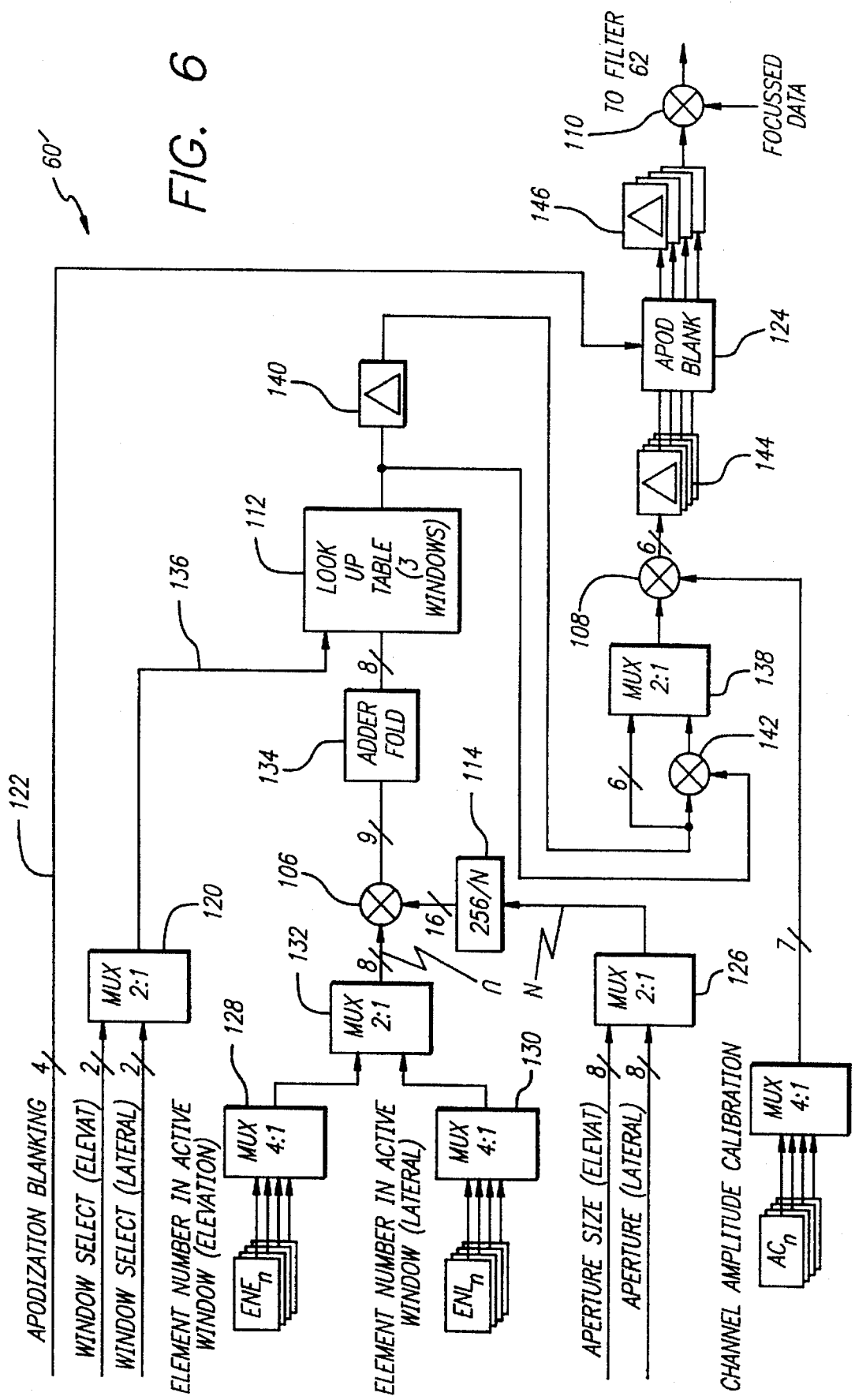

APODIZATION PARAMETER GENERATOR FOR ULTRASOUND MEDICAL IMAGING SYSTEM

BACKGROUND OF THE INVENTION

1. Field of the Invention

This invention relates generally to medical diagnostic ultrasound methods and apparatus and more particularly to an apodization parameter generator for a medical diagnostic ultrasound apparatus.

2. Description of the Related Art

Medical diagnostic ultrasound is the imaging of internal areas of a patient's body using ultrasound energy. Ultrasound energy is sound wave energy having a frequency greater than approximately 20 kHz. To generate ultrasound energy, electronic signals are input to a transducer which converts the electrical signals into ultrasound signals. Ultrasound signals, typically of 2 MHz to 10 MHz, are transmitted into a patient's body where they are in-part absorbed, dispersed, refracted and reflected. Reflected ultrasound signals are received at transducer elements which convert the reflected ultrasound signals back into electronic signals. A transmitter coupled to the transducer is controlled to form a transmit beam-pattern of ultrasound signals. A receiver coupled to the transducer is controlled to form a receive beam-pattern of ultrasound signals. A final ultrasound beam-pattern, to the first order, is a product of the transmit beam-pattern and the receive beam-pattern. The final beam-pattern typically is processed to analyze echo, Doppler and flow information and obtain an image of the patient's encountered anatomy (e.g., tissue, flow, Doppler).

Apodization is one of several beam-forming control parameters. Beam-forming parameters are used to control the final beam-pattern and enable meaningful scanning of a patient's anatomy. The beam-forming parameters include: aperture, apodization, focus and steering. Aperture is a control of the number of active transducer elements along the transducer array's azimuth or elevation. Apodization is a voltage weighting profile of the active elements. Focus is a time delay profile of such weighting. Steering is a control of focus "depth" point(s) along the azimuth or elevation.

Samples of ultrasound signals are processed to define a beam-pattern. Typically a beam-pattern has a main lobe (i.e., main beam) and multiple side lobes (i.e., side beams). Side lobes are ultrasound phase alignments at other than the desired steering angle (i.e., at other than the main lobe). Preferably, the main lobe is at a much higher decibel (db) level than the side lobes, so that echoes from patient anatomy corresponding to side lobes are substantially attenuated relative to echoes corresponding to the main lobe. A function of apodization control is to shape the beam-pattern. Specifically, apodization control is used to reduce the side lobes in the beam-pattern. In doing so, the main lobe becomes wider.

Apodization control is also used for reducing other extraneous acoustic signals, such as grating lobes, from the beam-pattern. Grating lobes are unwanted redundant beams. Typically, they are not as large as a main lobe, but larger than an average side lobe. Grating lobes result from the geometry of a multi-element transducer array. Specifically, when the spacing between transducer elements exceeds one-half of a wavelength at the operating frequency of the transducer array, grating lobes occur. Apodization control can be used to reduce grating lobes.

Side lobes and grating lobes are undesirable as they can result in side lobe artifacts or grating lobe artifacts. Side lobe artifacts are incorrect presentations of image information caused by sampling the side lobes. Sampling and grating lobe artifacts are incorrect presentations of image information caused by sampling the side or grating lobes. Grating lobes, for example, introduce errors and noise into the imaging process. Although the main lobe is directed at a target spatial area at a given instant in time, the contributions to the return echo include reflections caused by the grating lobes of different points. As a result, the image is smeared by the several contributions. Undesirable side lobe or grating lobe artifacts include duplication of image features, (e.g., duplicate fetal bones appearing like amniotic bands or sheets).

Effectively selecting apodization parameters reduces side lobes and grating lobes and corresponding artifacts. In generating a final beam-pattern, a window function is implemented. The beam-forming control parameters are input to the window function to achieve the final beam-pattern. The desired apodization parameters typically vary according to the window function and the size of the aperture. The window function typically changes according to the operating mode of the ultrasound system. For example, a different window may be used for B-mode scanning than for C-mode scanning. Also, a different window may be used for sonographic ultrasound than for Doppler ultrasound. Because ultrasound scans for different operating modes or different types of ultrasound often are interleaved, the apodization parameters may need to change regularly. Also, as the aperture may change dynamically while a patient is examined, the apodization parameters may need to change dynamically.

Previously, apodization parameter generation in medical ultrasound systems has been a processing-intensive method performed in a processing subsystem. Apodization parameters have been calculated, then downloaded to the transmitter or receiver beam-former in real-time. As a result, apodization parameter generation introduces significant processing overhead to the ultrasound system. There is a desire to reduce such overhead and free up processing time for other performance improving functions or to enable other more processing-intensive ultrasound applications. Accordingly, there is need of a more efficient method for generating apodization parameters.

Previously, an apodization parameter look-up table has been implemented in radar applications. According to such application, the table is a "straight" look-up table, including a separate set of parameters for each possible algorithm perturbation. Implementation of such a look-up table for medical ultrasound applications would require an excessive amount of random access memory (RAM), and consume substantial amounts of power and board space. The look-up table for an m-element transducer array, according to the radar implementation approach, would include approximately m! entries. Such a table would consume more power and more board space than the beam-former to receive the parameters or than a processing subsystem for calculating such parameters.

Accordingly, there is need for a more efficient apparatus and method for generating apodization parameters in a medical diagnostic ultrasound system.

SUMMARY OF THE INVENTION

According to the invention, apodization parameters are generated by accessing look-up tables. A parameter is generated for each active transducer element within a current aperture. Selection of the appropriate parameter for a given transducer element is based upon the total number of transducer elements (i.e., "N") forming the aperture and the given transducer element (i.e., "n").

In the preferred embodiment of the invention, the apodization parameters are generated as a beam-former. The invention may, however, be applied anywhere in the ultrasound system where windowing functions are used, for example, before the Fourier transformation used in conventional Doppler-mode systems.

According to one aspect of the invention, an apodization parameter generator is located on an integrated circuit that shares a common substrate with other circuitry such as a beam-former. For example, consider a 256-element transducer array which has 256 receive beam-former circuits allocated among 64 integrated circuits ("IC") at 4 beam-former circuits per IC. For such an embodiment, a preferred implementation is to have at least one apodization parameter generator on each of the 64 ICs. For the embodiment where there is one apodization parameter generator per IC, the resident generator is time-shared among the four resident beam-former circuits.

According to another aspect of the invention, the apodization parameter generator includes respective look-up tables for each of multiple window algorithms. For example, in one embodiment three look-up tables are stored in RAM or ROM for respective rectangular, Blackman-Harris and Hamming window algorithms. In alternate embodiments, at least one of the multiple look-up tables is used for two or more similar window algorithms.

According to another aspect of the invention, each look-up table for a given apodization parameter generator has a common, fixed number of entries, (i.e., a common size). In one embodiment, such size is at least as big as the number of transducer elements along the longest axis of the host transducer array. For a one dimensional ("1-D") transducer array having 256 elements, there is one axis. There are 256 elements along such axis. Thus, the look-up tables each have a common, fixed size of at least 256 entries. For a two-dimensional ("2-D") transducer array having 4 rows of 64 elements, an elevational axis has four transducer elements and an azimuthal axis has 64 elements. Thus, there are 64 elements along the longest axis. Thus, the look-up tables each have a common, fixed size of at least 64 entries.

In a preferred embodiment, each look-up table is symmetrical. As a result, the number of entries is reduced by a factor of two. Thus, for the first example above, each look-up table has a common, fixed size of at least 256 entries. For the second example above, each look-up table has a common, fixed size of at least 64 entries.

According to another aspect of the invention, the selected look-up table used for deriving apodization parameters is independent of focussing and steering changes. The selected table also is independent of whether the parameter is to be used for transmit or receive beam-forming. Further, the selected table is independent of whether the parameter is for elevational apodization or azimuthal apodization. Still further, the selected table is independent of the size of the elevation aperture and the azimuthal aperture. The selected look-up table is based on the window algorithm being implemented.

According to another aspect of the invention, a pointer into a selected look-up table is calculated from the aperture size in elements ("N") and the location of the transducer element for which the parameter is being derived ("n"). Consider the example of deriving apodization parameters for a receive beam-former along an elevation aperture that spans 4 transducer elements. The elevation apodization parameter pointer into the selected table for the second element of the four elements is derived from: (i) the total number of elements along the elevation (e.g., N=4); and (ii) the location of the element of interest (e.g., n=2). Consider the same transducer element for a receive beam-former along an azimuthal aperture that spans 256 transducer elements. The azimuthal apodization parameter pointer into the same table for the 13th element is derived from: (i) the total number of elements along the azimuth (N=256); and (ii) the location of the element of interest (n=13). Thus, the elevation apodization parameter of the given transducer element is accessed based upon N=4, n=2, and the azimuthal apodization parameter for the same transducer element is accessed from the same table based upon N=256, n=13. These two parameters are used to process sample receive data from the given transducer element as part of the implemented windowing algorithm. Note that the look-up table is not a straight look-up method, but instead is based upon deriving a pointer. By deriving an appropriate pointer, the same table can be used for different aperture sizes.

Apodization parameters are described as being dependent upon the window algorithm implemented and the aperture size. According to the invention, the various window algorithms are addressed by selecting among multiple look-up tables. Changes in aperture size are addressed by having the pointer into the table be dependent upon aperture size.

One advantage of the invention is that by looking up apodization parameters rather than calculating them repeatedly in real time, the parameters are available faster. Also, processor overhead is reduced, thus freeing up processing time for other tasks. Another advantage of the invention is that by locating the look-up table on a substrate that is shared with other circuitry such as a beam-former, the number of beam-former I/O ports and the beam-former I/O throughput can be reduced. An advantage of the calculated-index aspect of the invention is that the memory requirements for the look-up tables are substantially reduced relative to a straight look-up approach where a separate table is implemented for each window algorithm and for each possible aperture size. In effect, fewer look-up tables are needed. A meritorious effect is that the power requirements and board spacing requirements are substantially lower relative to the straight look-up approach.

BRIEF DESCRIPTION OF THE DRAWINGS

FIG. 3 is a block diagram of the partial beam-forming circuit of FIG. 2 according to an embodiment of this invention;

FIG. 5 is a block diagram of the apodization circuit of FIG. 3 according to an embodiment of this invention; and FIG. 6 is a block diagram of the apodization circuit of FIG. 3 according to another embodiment of this invention.

DETAILED DESCRIPTION

Ultrasound System Overview

Figure 1:
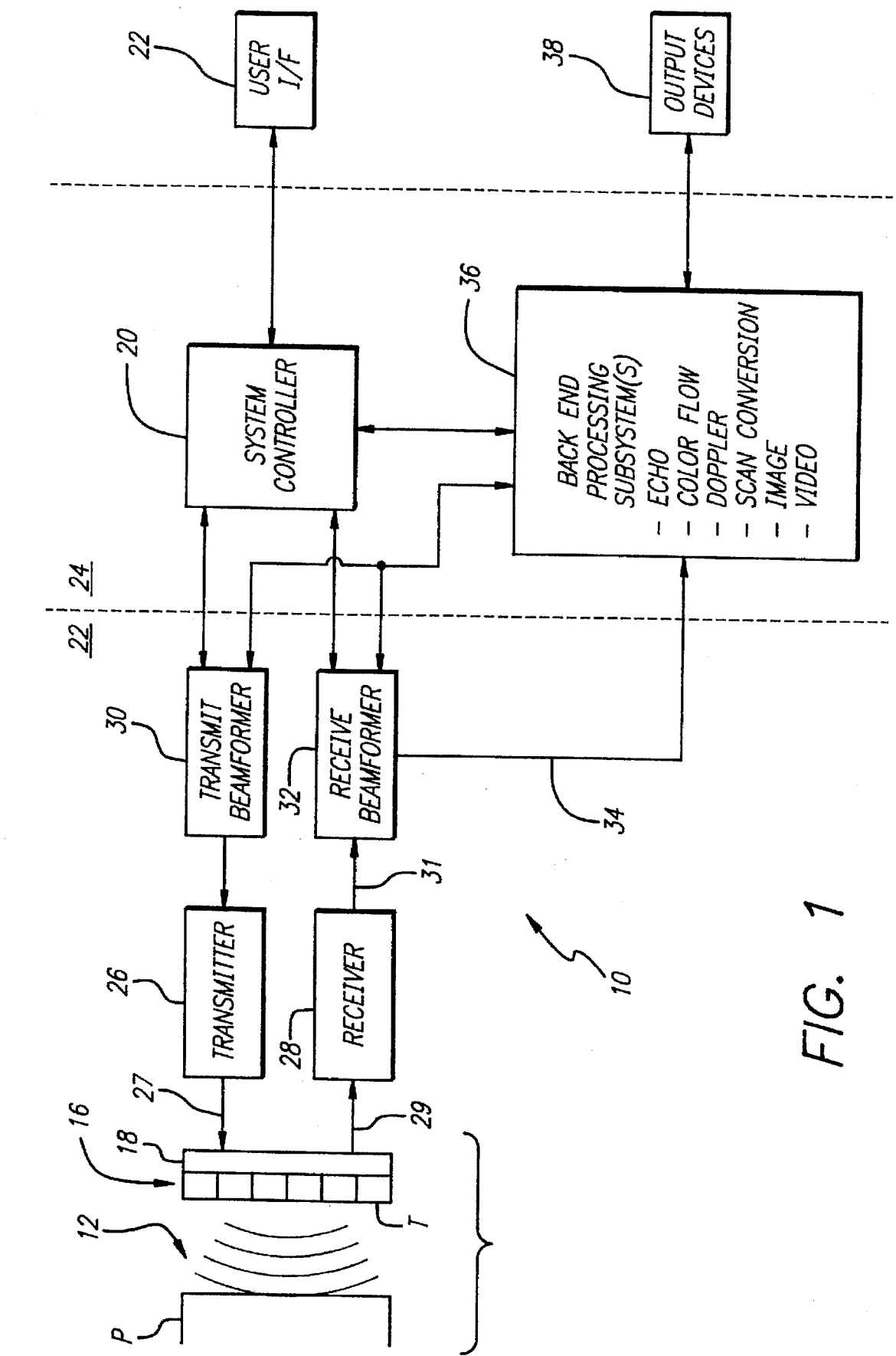
FIG. 1 is a block diagram of a medical diagnostic ultrasound system.

FIG. 1 shows a functional block diagram of a medical diagnostic ultrasound system 10. The function of the system 10 is to perform diagnostic sonography or flow processing of a patient P using ultrasound data. Ultrasound signals 12 are transmitted via a transducer array 16 of a probe 18 into the patient. Typically, the probe is held adjacent to and in contact with the patient. Reflected signals are detected and used to derive internal images of the patient for a scanned area/volume.

System operation is controlled via a system controller 20 in response to user commands input via a user interface 22 (e.g., keyboard, display, buttons). During operation, the system controller 20 outputs control signals to components at a system front end 22 and back end 24. Among other functions, the control signals initiate ultrasound scanning of the patient.

The front end 22 includes a transducer 16, transmitter 26, receiver 28, transmit beam-former 30, receive beam-former 32 and related circuitry. The transducer 16 typically is an array of transducer elements T. The elements transmit ultrasound signals, and also define multiple channels for receiving ultrasound signals.

The transmit beam-former 30 implements transmit beam-forming parameters (i.e., transmit aperture, apodization, focus and steering) for controlling corresponding transmitter 26 outputs. In some embodiments the parameters are downloaded from back end processing subsystems 36. In other embodiments one or more parameters are derived at the beam-former 30. The transmitter 26 and transmit beam-former 30 define transmit signals 27 for respective transducer 16 elements based upon the beam-forming parameters. Corresponding ultrasound signals 12 are generated by the transducer 16 elements in response to the transmit signals 27. The ultrasound signals define a transmit beam-pattern. The transmitted ultrasound signals 12 are in part absorbed, dispersed, refracted and reflected when travelling through the patient P.

Reflected signals are sensed, then converted into electrical signals 29 by transducer 16. Receiver 28 amplifies and digitizes the received electrical signals 29. The resulting digital signals 31 are routed to receive beam-former 32 which transforms the signals into patterned "beam-formed" signals 34 of digital ultrasound data.

The beam-formed signals 34 are routed to the back-end 24 where one or more back end processing subsystems 36 process the data. The beam-formed signals 34 undergo any one or more of echo signal processing, color flow processing, Doppler processing, image processing, scan conversion and video processing according to the mode of operation. The purpose of echo signal processing is to improve signal to noise ratio. The purpose of color flow processing is to estimate flow parameters using correlation, flow averaging and/or other processes. The purpose of Doppler processing is to determine Doppler shift and perform frequency analysis. The purpose of image processing is to enhance image depictions of the data. The purpose of the scan conversion is to transform the data from Cartesian or polar coordinate data into raster data. Back-end pre-processed or post-processed data is scan converted. Further, video processing may also be performed to condition a signal for output to a display device. Back-end pre-processed and/or post-processed data is output to one or more output devices 38 (e.g., tape storage, video monitor, printer, plotter).

By way of example, the invention is described below primarily with reference to its preferred use in a beam-former, since it has proven to be particularly advantageous in connection with beam-forming. The invention may, however, be applied anywhere in the ultrasound system where windowing functions are used, for example, before the Fourier transformation used in conventional Doppler-mode systems.

Receive Beam-former Overview

Figure 2:
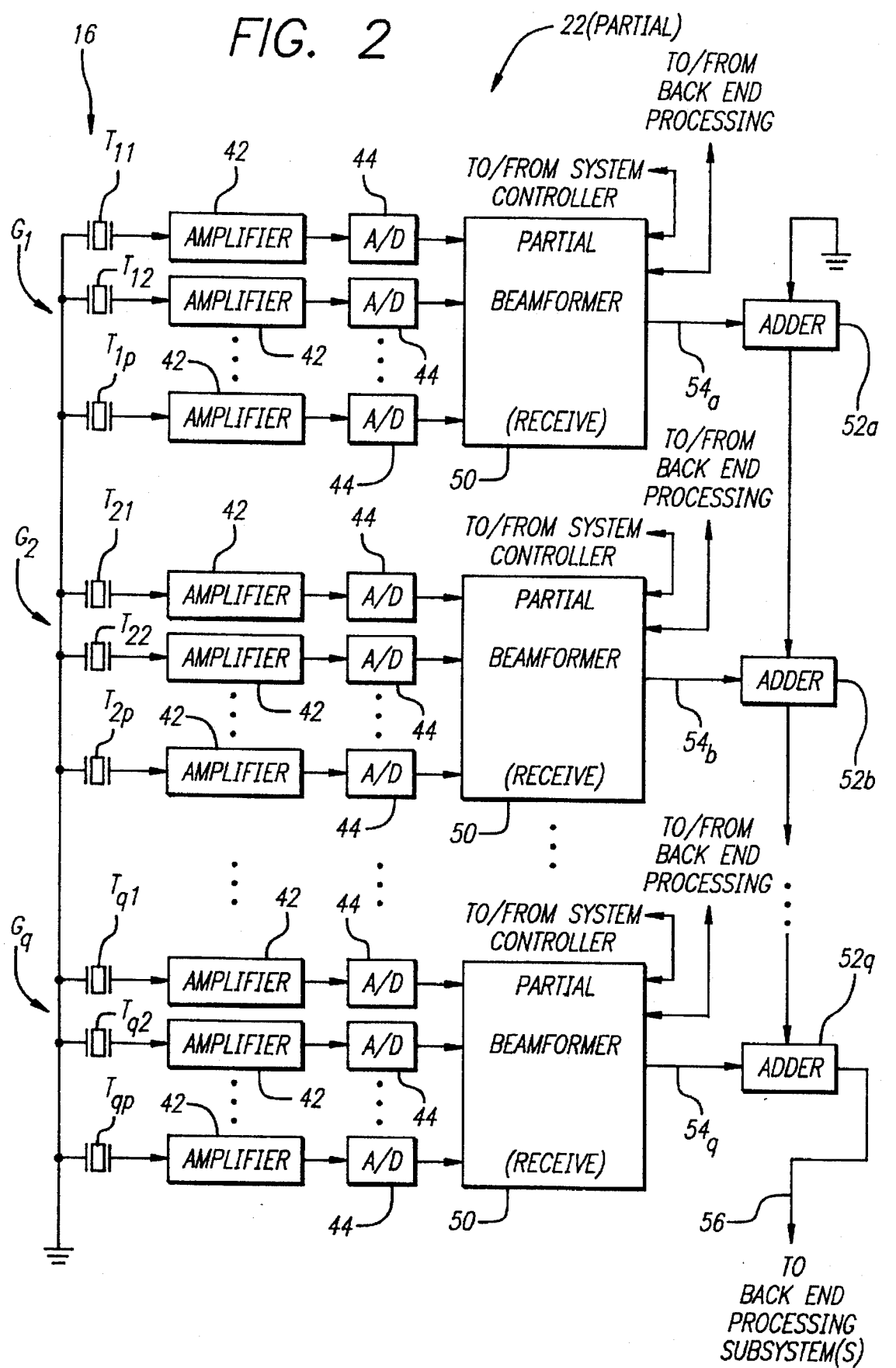
FIG. 2 is a block diagram of the "front end" receive channel portion of the system of FIG. 1.

FIG. 2 shows respective receive channels of front end 22. It generally is not practical to implement all beam-former signal processing channels on a single circuit board. Therefore, the receive beam-former 32 typically is divided into several groups G. Each group $G_j$ includes a partial beam-former $50_j$ and a number of receive channels (i.e., p channels). There is a receive channel for each transducer element T. The front end 22 includes k transducer elements, organized into q groups of p elements per group. In a typical embodiment k=64, 128, 256, or 512, although other values also occur. There are one or more transducer elements (p≧1) per group G. Typical values for p are 1, 2, 4, 8 or 16, although other values occur. For an array of 2562 elements and 4 elements per group, k=256, p=4 and q=64.

For a given group G, there are p transducer elements $T_{i1}$, $T_{i2}$, ..., $T_{ip}$, p corresponding amplifiers 42 and p corresponding analog to digital converters 44. In addition there is one partial beam-former 50 and an adder circuit 52. Thus, there are q partial beam-formers 50, one per group, which form the receive beam-former 32 and k amplifiers 42 and k A/Ds 44, p per group, which form the receiver 28.

Ultrasound signals are sensed by each respective transducer element $T_i$ and converted into electrical signals. Corresponding amplifier $42i$ and A/D $44i$ serve to amplify the electrical signal and convert it to digital form. The corresponding partial beam-former $50j$ transforms the data based upon beam-forming parameters to create a partial beam signal $54j$. An adder $52j$ coupled to the partial beam-former $50j$ combines the partial beam signal $54j$ with the cumulated partial beams from other groups (1 through j–1) preceding the given group $G_j$. At the last group $G_q$ adder $52q$ combines partial beam signal $54q$ with the cumulated partial beam signals to generate the full receive beam signal 56 which is output to the back end processing subsystem(s) 36.

Partial Beam-Former Circuit

FIG. 3 shows a block diagram of a partial beam-former circuit 50. The partial beam-former 50 receives the digitized signals from the respective receive channels of a group $G_j$, then performs steering, focussing and apodization for a given aperture. The partial beam-former 50 includes a focussing circuit 58, apodization circuit 60 and in some embodiments an interpolation decimation filter 62. The focussing circuit 58 implements time delays upon the incoming data to focus and steer the ultrasound signals from the respective transducer elements. The apodization circuit 60 implements spatial weighting profiles for the transducer elements included within the receive aperture. The filter 62 performs alignment, interpolation and decimation of data samples. As shown in the illustrated embodiment the filtering occurs during the beam-forming process. In the illustrated embodiment, the filtering occurs after apodization. In alternate embodiments, however, the interpolation decimation filtering occurs prior to apodization circuit 60 and/or focussing circuit 58.

According to the preferred embodiment, the partial beam-former for a given group $G_j$ is formed on an integrated circuit. Thus, the focussing circuit 58, apodization circuit 60 and in some embodiments filter 62 are formed on a common substrate for a given partial beam-former $50j$.

Figure 4:
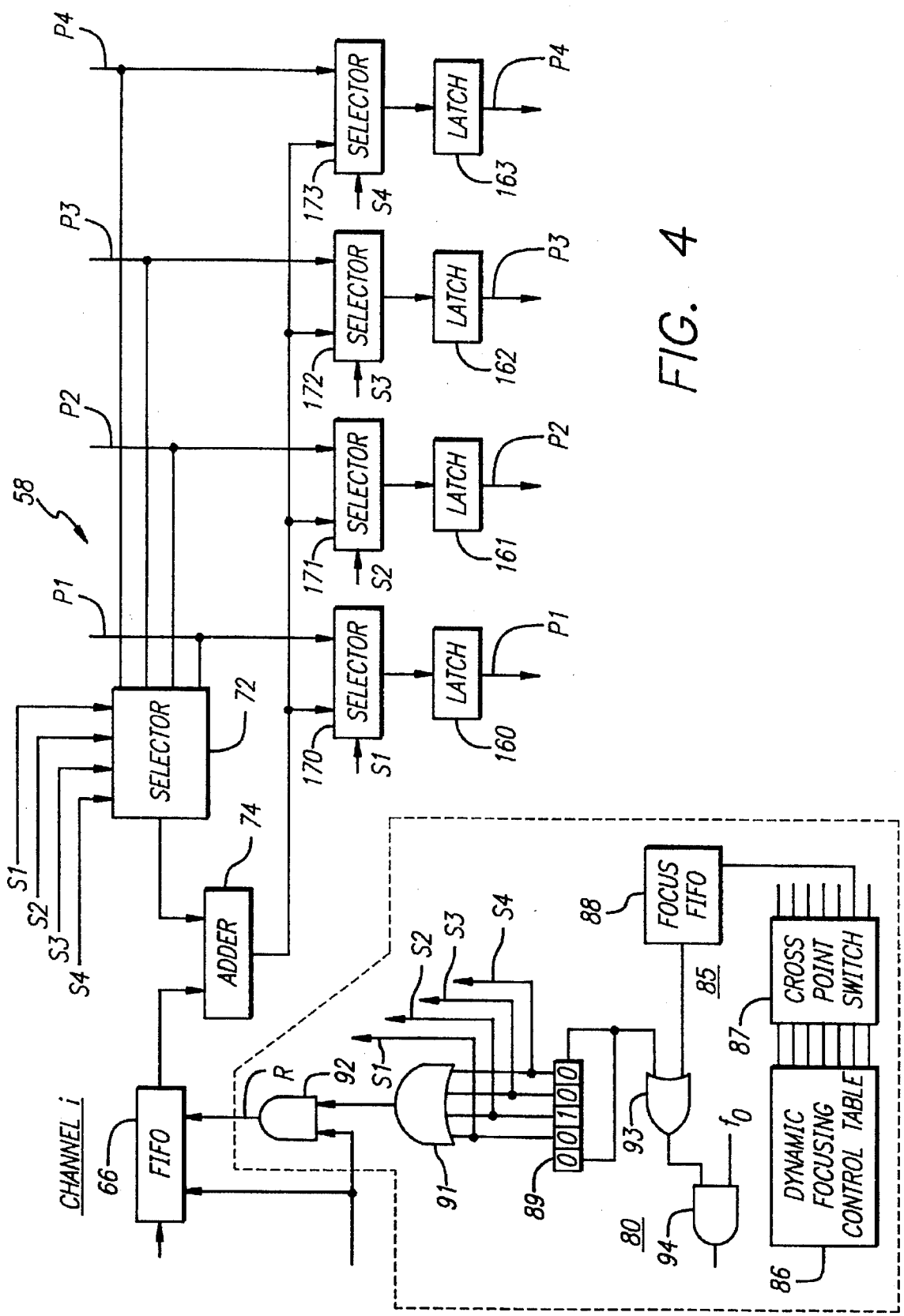
FIG. 4 is a block diagram of the focussing circuit of FIG. 3.

FIG. 4 shows a block diagram for one embodiment of focussing circuit 58. Such circuit is briefly described below, and described in more detail in U.S. Pat. No. 5,388,079 issued Feb. 7, 1995 on application Ser. No. 38,572 filed Mar. 26, 1993, titled "PARTIAL BEAM-FORMING".

The depicted focussing circuit 58 receives digitized data for a given channel i into FIFO 66 (or other memory buffer structure). In one embodiment the circuit 58 is used for each of the p channels in the group $G_j$. In another embodiment, there are p circuits 58, one per channel, forming the focussing circuitry and residing on the common substrate.

Data is input at a rate of $f_0$. The output data clock also is at a rate $f_0$, but is not uniform. At such rate, a rough delay unit of $1/f_0$ is implemented. Read out is stopped when additional delay time needs to be interjected.

To fine tune the delay time, the read out data is sorted into parallel summing paths. Each parallel path represents a different phase of read-out data. By shifting data to a next phase, the delay adjustment becomes $1/Nf_0$, referred to here as a fine delay unit. Each data sample from a given channel i is directed to one of L phases. In the illustrated embodiment L=4. In other embodiment L is fewer or more phases. Thus, the data sample is directed to one of four phases P1, P2, P3, or P4. Selectors 72, 170–173, adder 74 and latches 160–163 execute directing and serial summation for the data provided in the parallel data paths. Controller 80 determines into which phase data from a given channel is to be directed.

In one embodiment, the controller 80 outputs phase information for a given channel via a control signal R and selector control signals S1–S4. A delay data memory 85, which may comprise a look-up table 86 for storing focussing data for all channels of the beam-former or partial beam-former, a cross-point switch 87, and a shift register 88 outputs a 1-bit data stream for each channel i. A 5-bit shift register 89 generates phase information selector control signals S1–S4. A memory readout inhibit signal R is generated via "OR" gate 91 and a clocked "AND" gate 92. Only one bit of the 5-bit register 89 is set at a given time thereby indicating which of the four phases is to be directed. An "OR" gate 93 and an "AND" gate 94 are coupled as shown between the output P4 of the register 89 and its shift input to leave the control signals S1–S4 unchanged if no phase shift pulse from memory 85 occurs.

Focussed data from a channel i is input to the apodization circuit 60. In the preferred embodiment there is one apodization circuit 60 per group $G_j$. At a given time focussed data from a given channel is input to the apodization circuit 60.

Apodization Circuit

FIG. 5 is a block diagram of an apodization parameter generator circuit 60 according to an embodiment of this invention. The generator 60 receives inputs designating a specific transducer element ("n") and an aperture size ("N"). In response an apodization parameter is derived for the specific transducer element. The derived apodization parameter subsequently is applied to focussed data for a given channel. For a receive channel the beam-formed data is combined with beam-formed data of other channels to generate a receive beam pattern.

The apodization circuit 60 includes delay circuits 102–103, counter 104, multipliers 106, 108, 110, look-up table 112, divider 114 and memory 116. The circuit 60 receives the aperture size in transducer element units, a number identifying the transducer element channel to be processed, the focussed data for such channel and a channel equalization factor.

For an embodiment in which an apodization circuit 60 serves p channels in a group G, the focussed data is received into memory 116. In one embodiment memory 116 is SRAM formed as a buffer or FIFO. Typically the numbers identifying the channels to be processed are sequential corresponding to adjacent elements $T_{j1}$ though $T_{jp}$ in the given group Gj. In one embodiment the channels are processed in ascending order. The number n for the first channel i is input. Such input is delayed at circuit 102 to allow for delays in receipt of the focussed data. The subsequent numbers are generated by incrementing counter 104. In the preferred embodiment, 'n' corresponds to the unit position of the transducer element for the current receive channel being adjusted for apodization.

The aperture size N in element units is input into divider 114. Divider 114 is prescribed or programmed to divide N by the number of entries k in the apodization parameter look-up table 112. In the preferred embodiment k corresponds to the maximum aperture size in transducer elements. In another preferred embodiment, the transducer array 16 is symmetrical resulting in symmetrical apodization parameters among symmetrical elements. As a result, the look-up table in effect is folded over reducing the number of entries by a factor of 2. Thus, for such other preferred embodiment, the number of entries k in the table 112 is one-half the maximum aperture size in transducer element units. By dividing N by k the look-up table 112 is scaled to a given aperture size. For apertures N evenly divided into the size k, there is no error introduced in the scaling step. When not evenly divided, then a small error is introduced. Based upon experimental results it was found that worst case angular frequency response is within a few dB of an ideal response.

The output of the counter 104 and the divider 114 are multiplied to generate a pointer into the look-up table 112 for the current channel. The look-up table 112 is formed by RAM or ROM. In an embodiment using RAM, apodization parameters for a select apodization windowing function are loaded into the table 112. Such parameters can be changed to implement other windowing functions. In the ROM embodiment the apodization parameters are fixed in memory. In a specific commercial embodiment, apodization parameters are stored in a look-up table for multiple windowing functions, (e.g., multiple parallel look-up tables, one of which is active). In operation, the system controller 20 or a back end processing subsystem 36 selects which windowing function to implement. In a preferred embodiment, three windowing functions are implemented: Hamming, Blackman-Harris and rectangular. Windowing functions included in alternate embodiments include rectangular, triangular, Hamming, Hanning, Riesz, Riemann, Dela Valle Poussin, Tukey, Bohman, Poisson, Hanning-Poisson, Cuachy, Gausian, Dolph-Chebyshev, Barcilontemes, exact Blackman, Blackman, Blackman-Harris, and Kaiser-Bessel. Other windowing function known or to be discovered also may be implemented with apodization parameters stored in the look-up table 112.

With the appropriate apodization function active and the specific parameter for the current channel selected, the parameter is output to a multiplier 108. Multiplier 108 serves to perform channel calibration so as to correct for gain errors in the analog portion of the front end 22. The selected apodization parameter is multiplied by the calibration factor. Such factor is applied to the multiplier 108 via a delay circuit 103. The calibrated apodization value then is input to multiplier 110 where it is multiplied with the focussed data from the current channel. The output is beam data for the current channel. The beam data is output to filter 62 to undergo interpolation and decimation filtering. The filtered data in turn is output to adder 52j (see FIG. 2) for cumulating a partial beam pattern for the current and prior groups $G_1$ through $G_j$.

FIG. 6 shows a more detailed embodiment of an apodization circuit 60' for a specific embodiment. Like parts are numbered with the same numbers as in the FIG. 5 embodiment. Not shown are delay circuits 102, 103. The apodization circuit 60' depicts a specific embodiment in which each group G includes 4 receive channels, and in which address folding is implemented for a symmetrical look-up table 112. The look-up table is formed by RAM or ROM and implements three different windowing functions. A multiplexer 120 receives a window select signal for each of a current elevation aperture and a current azimuthal aperture. Thus, different windowing functions can be implemented for elevation and azimuth.

The elevation and azimuthal aperture sizes are input to circuit 60' at multiplexer 126. The size 'N' of the selected elevation or azimuthal aperture in transducer element units is output from multiplexer 126. Divider 114' scales the look-up table for the current aperture size. In the depicted embodiment k=256, where k is one-half a maximum aperture size of 512. Address folding is used to reduce the size of the look-up table 112. The pointer into the look-up table 112 is generated by multiplier 106, address folding circuit 134 and the window select signal 136.

The selected apodization parameter is output to a register 140. For a 1-D array the parameter is forwarded through multiplexer 138. For a 2-D array the parameter stored in the register is a directional parameter (e.g., an azimuthal or elevational apodization parameter). The stored parameter then is multiplied by the following parameter at multiplier 138. such following parameter is of the other direction. Thus an apodization parameter for an element in a 2-D array is derived by multiplying the azimuthal parameter and elevational parameter for such element. The multiplexer 138 selects the multiplier 142 output for a 2-D array and selects the register output for a 1-D array.

The apodization parameter output from multiplexer 138 is adjusted at multiplier 108 to calibrate for gain in the analog portion of the front end 22. The adjusted apodization parameter then passes through a blanking stage formed by delay circuits 144, 146 and blanking circuit 124. An azimuth aperture blanking signal 122 is received at the blanking circuit 124 activating blanking for channels outside the current aperture. Thus, circuit 124 blanks out generated apodization parameters for channels outside the current aperture. The resulting apodization parameter then is applied to the corresponding focussed data received from focussing circuit 58 at multiplier 110. Partial beam data results, and is forwarded to filter 62.

In operation a stream of apodization parameters are generated corresponding to data for respective channels in a group $G_j$. An apodization parameter is applied to a corresponding sample of focussed data, then filtered and cumulated to generate a partial beam for the group $G_j$.

Meritorious and Advantageous Effects

One advantage of the invention is that by looking up apodization parameters rather than calculating them repeatedly in real time, the parameters are available faster. Also, processor overhead is reduced freeing up processing time for other tasks. Another advantage of the invention is that by locating the look-up table on a common substrate with corresponding beam-former circuitry, the number of beam-former I/O ports and the beam-former I/O throughput can be reduced. An advantage of the calculated-index aspect of the invention is that the memory requirements for the look-up tables are substantially reduced relative to a straight look-up approach. In effect, fewer look-up tables are needed. A meritorious effect is that the power requirements and board spacing requirements are substantially lower relative to a straight look-up approach.

What is claimed is:

1. A method of generating an apodization parameter for adjusting data received from a given transducer element as part of a beam-forming function in a medical diagnostic ultrasound apparatus, comprising the steps of:

defining a look-up table comprising K number of apodization parameter entries;

identifying a length of an aperture in a direction of interest in transducer element units;

identifying unit position of the given transducer element within the aperture;

deriving a pointer into the look-up table as a function of at least said length, said unit position and the number K;

selecting an apodization parameter from the look-up table based upon said pointer, wherein the selected apodization parameter is for adjusting data received from the given transducer element as part of a beam-forming function.

2. The method of claim 1, in which the function for deriving the pointer comprises calculating said unit position times K divided by said length.

3. The method of claim 1, wherein the given transducer element is part of a plurality of transducer elements arranged in an transducer array, and in which K is at least as big as a maximum aperture length of the transducer array in transducer element units.

4. The method of claim 3, in which the transducer array comprises multiple rows of transducer elements, and wherein the maximum transducer aperture length is the greater of a maximum elevational aperture length and a maximum azimuthal aperture length.

5. The method of claim 1, wherein the given transducer element is part of a plurality of transducer elements arranged in an transducer array, and in which K is at least as big as one-half a maximum aperture length of the transducer array in transducer element units; and wherein K is an integer value.

6. The method of claim 1, in which the step of defining the look-up table comprises defining a look-up table comprising K number of apodization parameter entries for each of a plurality of window algorithms, and wherein the step of deriving a pointer comprises selecting one of the plurality of look-up tables, and wherein the step of selecting an apodization parameter comprises selecting an apodization parameter from the selected look-up table.

7. The method of claim 1 performed as part of a method of beam-forming, the beam-forming method comprising the steps of:

receiving an electronic signal corresponding to an ultrasound signal detected at the given transducer element;

transforming the received electronic signal based upon at least a focus parameter and the selected apodization parameter; and wherein the transforming step is performed by a beam-forming circuit, and the beam-forming circuit and look-up table reside on a common substrate.

8. A medical diagnostic ultrasound beam-forming apparatus having resident apodization parameter generation, comprising:

a transducer array comprising a plurality of transducer elements defining an aperture of interest;

a beam-former circuit that receives an electronic signal corresponding to an ultrasound signal detected at a predetermined transducer element of the plurality of transducer elements and transforms the received electronic signal based upon at least a focus parameter and an apodization parameter, said beam-former circuit comprising;

a look-up table memory that stores a number of apodization parameter entries;

a pointer signal generating means having a first input for receiving a first signal indicating size of the aperture of interest in transducer element units, a second input for receiving a second signal indicating relative location of said predetermined transducer element within the aperture, and a third input for receiving a third signal identifying the number of apodization parameter entries stored in the look-up table memory, said generating means having means for generating a pointer output signal to the memory for accessing an apodization parameter associated with said predetermined transducer element of said array, said memory thereby outputting the accessed apodization parameter.

9. The apparatus of claim 8, in which said pointer signal generating means includes means for deriving the pointer signal as the second signal times the third signal divided by the first signal.

10. The apparatus of claim 8, in which said look-up table memory stores a number of apodization parameter entries equal to a maximum aperture length of the transducer array in transducer element units.

11. The apparatus of claim 10, in which the plurality of transducer elements are arranged in a plurality of rows, and the maximum transducer aperture length is the greater of a maximum elevational aperture length and a maximum azimuthal aperture length.

12. The apparatus of claim 8, in which said look-up table memory stores a number of apodization parameter entries equal to a nearest integer to one-half a maximum aperture length of the transducer array in transducer element units and, wherein the maximum transducer aperture length is the greater of a maximum elevational aperture length and a maximum azimuthal aperture length, said nearest integer being at least as big as one-half the maximum aperture length in transducer element units.

13. The apparatus of claim 8, in which the look-up table memory stores apodization parameter entries for each one of a plurality of window algorithm functions, and said pointer signal generating means further comprises a means for generating and applying to the look-up table memory a window select signal indicating an active one of the plurality of window algorithm functions.

14. The apparatus of claim 8, wherein said beam-former circuit further comprises a focussing circuit which receives the electronic signal corresponding to the ultrasound signal detected at the first transducer element and applies a focussing parameter to the received electronic signal to generate focussed data and means for applying the apodization parameter output from said look-up table memory to said focussed data.

15. A method of generating an apodization parameter for adjusting data received from a given transducer element as part of a beam-forming function in a medical diagnostic ultrasound apparatus, comprising the steps of:

storing in a look-up table apodization parameter entries for a number of apodization window algorithms, the number of entries in the look-up table comprising K times the number of apodization window algorithms;

identifying a length of an aperture in a direction of interest in transducer element units;

identifying unit position of the given transducer element within the aperture;

deriving a pointer into the look-up table as a function of at least said length, said unit position and the number K;

defining a window select signal corresponding to one of the number of apodization window algorithms;

selecting an apodization parameter from the look-up table based upon said pointer and said window select signal, wherein the selected apodization parameter is for adjusting data received from the given transducer element as part of a beam-forming function.

16. The method of claim 15, in which the function for deriving the pointer comprises calculating said unit position times K divided by said length.

17. The method of claim 16, wherein the given transducer element is part of a plurality of transducer elements arranged in an transducer array, and in which K equals a maximum aperture length of the transducer array in transducer element units and the maximum transducer aperture length is the greater of a maximum elevational aperture length and a maximum azimuthal aperture length.

18. The method of claim 16, wherein the given transducer element is part of a plurality of transducer elements arranged in an transducer array, and in which K equals a nearest integer to one-half a maximum aperture length of the transducer array in transducer element units and the maximum transducer aperture length is the greater of a maximum elevational aperture length and a maximum azimuthal aperture length, said nearest integer being at least as big as one-half the maximum aperture length in transducer element units.

19. The method of claim 1, wherein the given transducer element is part of a plurality of transducer elements arranged in an transducer array, and in which K is a multiple of a maximum aperture length of the transducer array in transducer element units.

* * * * *